(No Model.) 2 Sheets—Sheet 1.
R. R. WILLIAMS.
COMBINED INDEX PAMPHLET AND FILE.
No. 412,147. Patented Oct. 1, 1889.
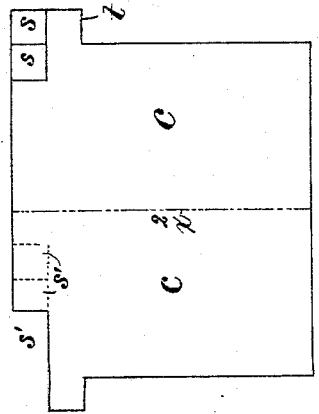
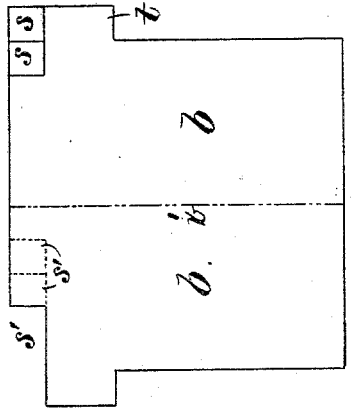
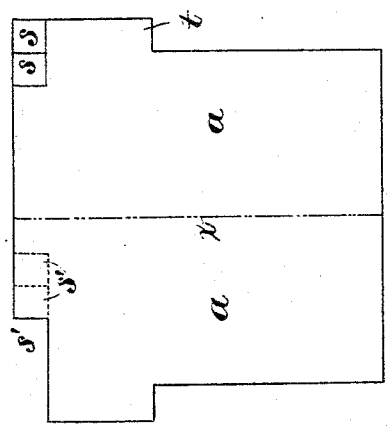
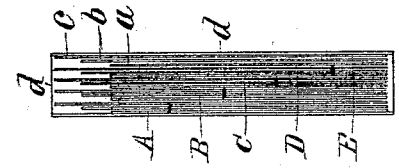
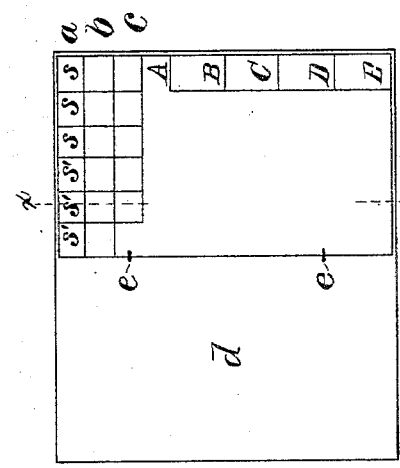
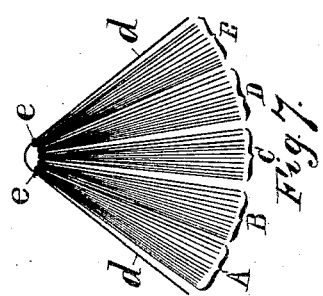
Attest:
L. Lee.
H. J. Miller
Inventor.
R. R. Williams, per
Cranes Miller, Attys
N. PETERS, Photo-Lithographer, Washington, D. C.

(No Model.) 2 Sheets—Sheet 2.
R. R. WILLIAMS.
COMBINED INDEX PAMPHLET AND FILE.
No. 412,147. Patented Oct. 1, 1889.
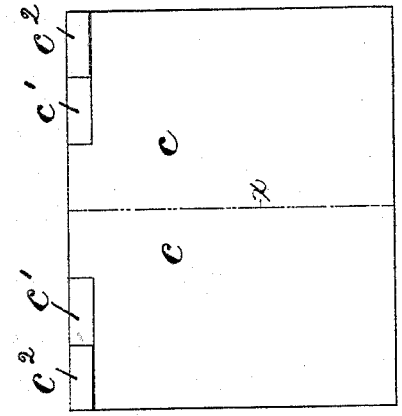
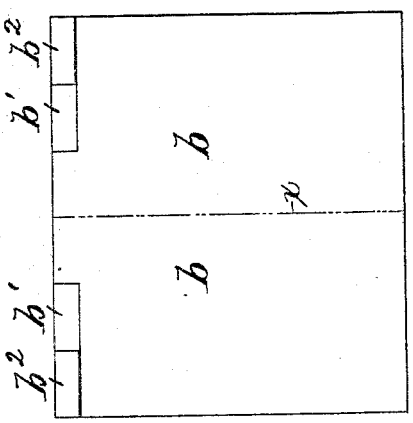
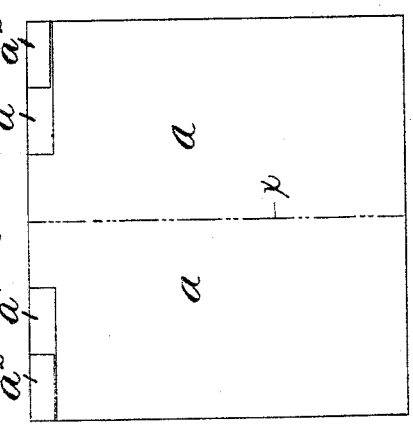
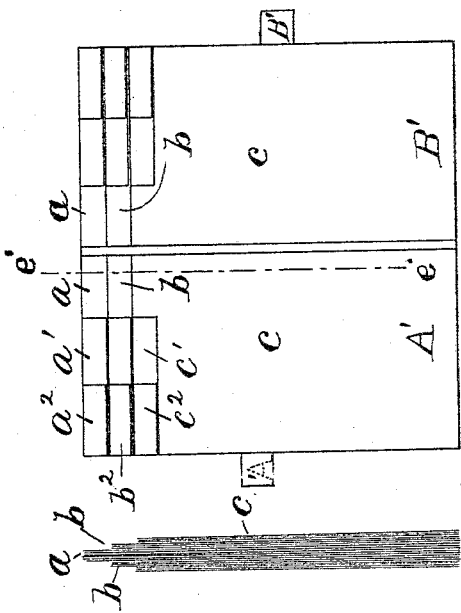
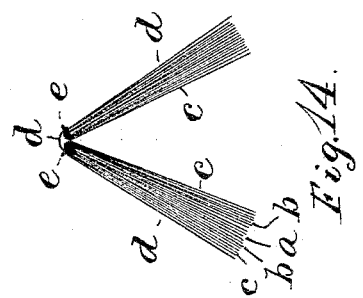
Attest:
L. Lee.
K. J. Miller
Inventor.
R. R. Williams, per
Crane & Miller, Attys.

UNITED STATES PATENT OFFICE.

RICHARD R. WILLIAMS, OF BROOKLYN, NEW YORK.

COMBINED INDEX-PAMPHLET AND FILE.

SPECIFICATION forming part of Letters Patent No. 412,147, dated October 1, 1889.

Application filed October 4, 1888. Serial No. 287,228. (No model.)

*To all whom it may concern:*

Be it known that I, RICHARD R. WILLIAMS, a citizen of the United States, residing at Brooklyn, Kings county, New York, have invented certain new and useful Improvements in Index-Pamphlet and File, fully described and represented in the following specification and the accompanying drawings, forming a part of the same.

The object of this invention is to furnish a file, catalogue, album, or index rerum with a series of pamphlets or groups of leaves having a large number of titles exposed; and the invention consists, partly, in a pamphlet having several series of leaves of uniform width from the hinge outward, and the several series of leaves being successively shortened at the top end of the pamphlet, the leaves in each series having their edges coincident, and the outer leaves of each series being notched to expose the inner leaves.

It also consists in the combination, with a cover or case, of several pamphlets of uniform width and height, consisting each in several series of leaves successively shortened, with the edges of the leaves in each series notched to expose index-spaces upon the inner leaves of the pamphlet, as set forth, and the edges of the pamphlet being provided with a marginal index at the desired points.

In Figures 1 to 7 the sheets are cut to expose all the titles at one side of the pamphlet, while in Figs. 8 to 14 half of the leaves, when folded, have their index upon one side of the pamphlet and half upon the other.

Figs. 1, 2, and 3 are front views of three series of sheets of different length to form one pamphlet; Fig. 4, a plan of the series shown in Fig. 1; Fig. 5, a front view of the cover opened, with its contents turned wholly to the right. Fig. 6 is an edge view of the right side of the whole file or collection of pamphlets with their cover. Fig. 7 is a plan of the same partly opened. Figs. 8, 9, and 10 are front views of three symmetrically-notched series of sheets to form one pamphlet. Fig. 11 is a top or end view of the three series folded loosely together. Fig. 12 shows two such pamphlets secured at their backs in a cover and turned apart. Fig. 13 is a vertical section on line $e\,e$ in Fig. 12, and Fig. 14 is a plan of the file or book shown in Fig. 13 partly opened.

In Fig. 5 each pamphlet in the file or collection of five pamphlets is provided with a title-space $s$ or $s'$ at the front for each leaf in the pamphlet, and the edges of the several pamphlets A, B, C, D, and E are notched to expose those behind them in the file, and index-marks are applied to such edges.

For illustration, the three series of leaves $a\,b\,c$ in each pamphlet are formed of three folded sheets, forming six leaves, and the eighteen title-spaces for the whole eighteen leaves are formed by notching the sheets, as shown in Figs. 1, 2, and 3, the sheets in Figs. 2 and 3 being shortened successively at the top, so that when the series of sheets shown in Figs. 2 and 3 are folded and laid upon the top of those in Fig. 1 a group is formed like that shown at A upon the front of the file in Figs. 5 and 6.

The series of sheets $a$, $b$, and $c$ in Figs. 1, 2, 3, or 4 is provided with graded notches $s$ in the right-hand corner similar to those shown at $s$ upon the right of the pamphlet A in Fig. 5; but the left corners are notched more deeply at $s'$ to form, when folded on the lines $x\,x'\,x^2$, the other spaces $s'$ shown in Fig. 5. The series of leaves $a$, $b$, and $c$ are folded separately, and the three series are then laid upon one another, with the shortest on top, to form a single pamphlet with the leaves successively shortened and notched to expose title-spaces upon them all.

It will be noticed that all the leaves of the different series in each pamphlet are of the same width from the hinge outward toward the edge of the book, while the several series of leaves in each pamphlet are of different lengths, and are shortened at the end or top of the pamphlet.

The front side of a single pamphlet, upon which the titles are exposed, is fully shown in Fig. 5, where the front pamphlet obscures those that are laid behind it in the same cover, and it will be seen by inspection of these figures, as well as of Fig. 6, that the leaves in each pamphlet are successively shortened at the top end to form three series, and that the title-spaces upon all the leaves are thus fully exposed to view upon the front of the pamphlet.

Any number of such pamphlets or groups of leaves may be secured together in a cover $d$ to form a file or memorandum-book, which then appears in plan, as in Fig. 7, or in edge view, as in Fig. 6.

A simpler method of notching is shown in

Figs. 8, 9, 10, and 12, by which half the title-spaces appear at the front and half at the rear side of each pamphlet.

In Fig. 12 a file of two such pamphlets A' and B' is shown with the rear side of A' and the front side of B' exposed, and it will be noticed that each has nine title-spaces exposed at the top, and it also has the same number of spaces upon its opposite side when turned over. These are formed by notching the outer sheets in each series symmetrically and laying the three series of Figs. 8, 9, and 10 together in the proper order before folding them.

In Fig. 8 the outer leaves $a$ $a$ are notched at equal distances upon each side of the line $x$ to expose the inner leaves $a'$ and $a^2$, and the leaves $b$ and $b$ in Fig. 9 and the leaves $c$ and $c$ in Fig. 10 are notched likewise. The shorter series are laid upon the longer ones, and then all are folded on the lines $x$ with the shortest leaves outside, as shown in Figs. 12 and 11, respectively. The leaves lettered $c$ are thus brought upon the opposite outer sides of the pamphlet or group, and half the title-spaces appear at the front and half at the back of the group, as shown in Figs. 12 and 13.

The effect in successively shortening the leaves and exposing title-spaces for them all is the same in all the constructions shown, the method of folding the leaves merely causing the title-spaces to be exposed in a different location.

In all the constructions the sheets are notched, as shown in Figs. 1, 2, 3, 8, 9, and 10, before they are folded and secured together, and the labor of marking out and cutting the edges of the leaves separately by hand, as has heretofore been done, is thus wholly avoided.

Tags lettered A' (in dotted lines because turned over) and B' are shown attached to the two pamphlets in Fig. 12, and operate the same as the marked spaces upon the edges of the leaves in Fig. 5. To provide for such marked spaces with the construction shown in Fig. 5, the sheets shown in Figs. 1, 2, and 3 are notched before they are folded; but such notching obviously diminishes the available area of every page in the pamphlet, and as but a small number of such tags would in any case be required the pamphlets would preferably be constructed as shown in Fig. 12, the tags being attached to the pamphlets in suitable order to facilitate reference to any one of them. The tags would, if desired, be applied to other or intermediate points within the several pamphlets, and form a marginal index to the file however applied.

It is evident that the group of sheets shown in Figs. 8, 9, and 10 may be folded with the shorter leaves inside and not upon the outside, as indicated in Fig. 12, and when a series of such pamphlets is bound together in a cover the effect would be substantially the same except that the first index would be exposed at the ninth leaf from the beginning instead of at the first page. The location of the different indices throughout the group of pamphlets would, however, be immaterial, as the marginal marks or tags would provide the necessary means for referring thereto.

In the drawings the back $d$ is shown as a mere sheet of stiff paper with the pamphlets secured therein at their folds by stitches $e$; but it is immaterial how the pamphlets be secured in the cover provided the folded edges of the sheets are connected together like the leaves of an ordinary book.

I am aware of United States Patent No. 324,584, in which is shown a book having the opposite leaves of the cover of different widths from the hinge outward, and containing a series of signatures or pamphlets shortened successively at the edge opposite the hinge, by which all the marginal indexes in the entire book are simultaneously exposed to view, and are therefore liable to become soiled and defaced when the cover is closed. In my construction the leaves are all of the same width from the hinge outward, and while the several pamphlets within the same cover have several series of leaves successively shortened each pamphlet in the cover is of the same length and width, and the others being of equal width from the hinge outward, all the pamphlets and their indexes are wholly inclosed and protected by the cover. I am also aware of United States Patents No. 310,329, dated January 6, 1885, and No. 359,469, dated March 15, 1887, which show various methods of indexing; and I hereby disclaim such patents and the above-mentioned patent, No. 324,584, dated August 18, 1885.

Having thus set forth my invention, what I claim herein is—

1. A pamphlet having several series of leaves of uniform width from the hinge outward, and the several series of leaves being successively shortened at the top end of the pamphlet, the leaves in each series having their edges coincident and the outer leaves of each series being notched to expose the inner leaves, as and for the purpose set forth.

2. The combination, with a cover or case, of several pamphlets of the same length and width, consisting each in several series of leaves successively shortened, with the edges of the leaves in each series notched to expose index-spaces upon the inner leaves of the pamphlet, as set forth, and the edges of the pamphlets being provided with a marginal index at the desired points, as and for the purpose set forth.

In testimony whereof I have hereunto set my hand in the presence of two subscribing witnesses.

RICHARD R. WILLIAMS.

Witnesses:
JOHN SWING,
HENRY J. MILLER.